US012061513B2

United States Patent
Smeloy et al.

(10) Patent No.: US 12,061,513 B2
(45) Date of Patent: Aug. 13, 2024

(54) CRYPTOCURRENCY MINER WITH CURRENT REDUCING COMPUTE ENGINE ARRANGEMENT

(71) Applicant: Chain Reaction Ltd., Yokneam (IL)

(72) Inventors: Yossi Smeloy, Kamon (IL); Gil Shefer, Haifa (IL); Eyal Frost, Balfuria (IL); Rony Gutierrez, Pardes Hanna-Karkur (IL)

(73) Assignee: CHAIN REACTION LTD., Yokneam (IL)

( * ) Notice: Subject to any disclaimer, the term of this patent is extended or adjusted under 35 U.S.C. 154(b) by 0 days.

(21) Appl. No.: 17/516,155

(22) Filed: Nov. 1, 2021

(65) Prior Publication Data

US 2023/0139439 A1     May 4, 2023

(51) Int. Cl.
*H04L 12/00* (2006.01)
*G06F 1/3296* (2019.01)
*H04L 9/06* (2006.01)

(52) U.S. Cl.
CPC .......... *G06F 1/3296* (2013.01); *H04L 9/0643* (2013.01)

(58) Field of Classification Search
CPC .... G06F 1/3296; G06F 1/206; G06F 9/30098; H04L 9/0643; G06Q 40/02
USPC .................................................. 709/201, 204
See application file for complete search history.

(56) References Cited

U.S. PATENT DOCUMENTS

| | | | |
|---|---|---|---|
| D915,766 S * | 4/2021 | Su | D3/272 |
| 2016/0112200 A1* | 4/2016 | Kheterpal | G06F 9/30098 380/28 |
| 2016/0125040 A1* | 5/2016 | Kheterpal | G06Q 20/06 707/776 |
| 2020/0286170 A1* | 9/2020 | Kramer | G06Q 40/02 |
| 2021/0143980 A1* | 5/2021 | Harris | H04L 9/0643 |
| 2021/0192499 A1* | 6/2021 | Wu | G06Q 50/06 |
| 2021/0192619 A1* | 6/2021 | Wu | G06F 1/206 |
| 2023/0037377 A1* | 2/2023 | Fresa | G06Q 40/06 |
| 2023/0331351 A1* | 10/2023 | Moffat | H04L 9/0643 |

FOREIGN PATENT DOCUMENTS

| | | | | |
|---|---|---|---|---|
| OA | 19964 A | * 12/2018 | | H04L 9/00 |
| WO | 2015077378 A1 | 5/2015 | | |
| WO | WO-2019213625 A1 | * 11/2019 | | G05B 9/02 |

OTHER PUBLICATIONS

"AsicBoost—A Speedup for Bitcoin Mining", Dr. Timo Hanke, Mar. 31, 2016, 10 pages.
"Crypto Mining: Network Difficulty, Share Difficulty and Hash Functions", Luxor Tech, Feb. 20, 2020, 6 pages.
(Continued)

*Primary Examiner* — Frantz Coby
(74) *Attorney, Agent, or Firm* — McAndrews, Held & Malloy, Ltd.

(57) ABSTRACT

A cryptocurrency miner includes a power supply, a network interface, a compute module, and a controller. The compute module includes compute engine stories coupled in series with the power supply. Each compute engine story includes compute engines coupled in parallel between a voltage input node and voltage output node of the respective compute engine story. The controller receives, via the network interface, a job from a pool server of a mining pool and distributes aspects of the job to the compute engine stories.

20 Claims, 4 Drawing Sheets

(56) References Cited

OTHER PUBLICATIONS

"Mastering Bitcoin", Andreas M. Antonopoulos, Published by O'Reilly Media, Inc. 2010, 87 pages.
Federal Information Processing Standards Publication, Aug. 2015, 36 pages.
"Optimising the SHA256 Hashing Algorithm for Faster and More Efficient Bitcoin Mining", Rahul P. Naik, Department of Computer Science, University College of London, Sep. 2, 2013, 65 pages.
BitmainAntminer—Youtube video, https://www.youtube.com/watch?v=_R36wWMM34M.
MicroBT Whatsmainer—Youtube video, https://www.youtube.com/watch?v=6vtq1m8w5eQ.
SHA-256 The Center Of Bitcoin—Andreas M. Antonopoulos—Youtube video, https://www.youtube.com/watch?v=TvqDbLnsSNs.
International Search Report and Written Opinion for PCT/IB2022/059887, mailed Dec. 25, 2022, 9 pages.

\* cited by examiner

CRYPTOCURRENCY MINER WITH CURRENT REDUCING COMPUTE ENGINE ARRANGEMENT

BACKGROUND

Cryptocurrency is a digital asset designed to work as a medium of exchange. Individual coin ownership records are stored in a ledger or blockchain. Unlike conventional currencies, cryptocurrency does not typically exist in a physical form and is typically not issued by a central authority.

A blockchain provides a continuously growing list of records, called blocks, which are linked and secured using cryptography. Each block typically contains a hash pointer as a link to a previous block, a timestamp, and transaction data. By design, blockchains are inherently resistant to modification of the data. A blockchain is typically managed by a peer-to-peer network collectively adhering to a protocol for validating new blocks. Once recorded, the data in any given block cannot be altered retroactively without the alteration of all subsequent blocks, which requires collusion of the network majority.

In cryptocurrency networks, miners validate cryptocurrency transactions of a new candidate block for the blockchain via a Proof-of-Work algorithm. A side effect of validating the candidate block is the creation of newly minted cryptocurrency. The newly minted cryptocurrency as well as associated services fees are awarded to the miner that was the first miner to validate the candidate block and thus complete the Proof-of-Work algorithm.

This winner-takes-all compensation scheme has created an arms race for more efficient miners. Furthermore, mining pools have developed in an attempt to lessen the risks associated with the winner-takes-all compensation scheme. Miners or members of a mining pool share their processing power and split any obtained reward among the members according to the amount of work they contributed.

Limitations and disadvantages of conventional and traditional cryptocurrency mining approaches will become apparent to one of skill in the art, through comparison of such approaches with the present disclosure as set forth in the remainder of the present disclosure with reference to the drawings.

SUMMARY

Figure 1:
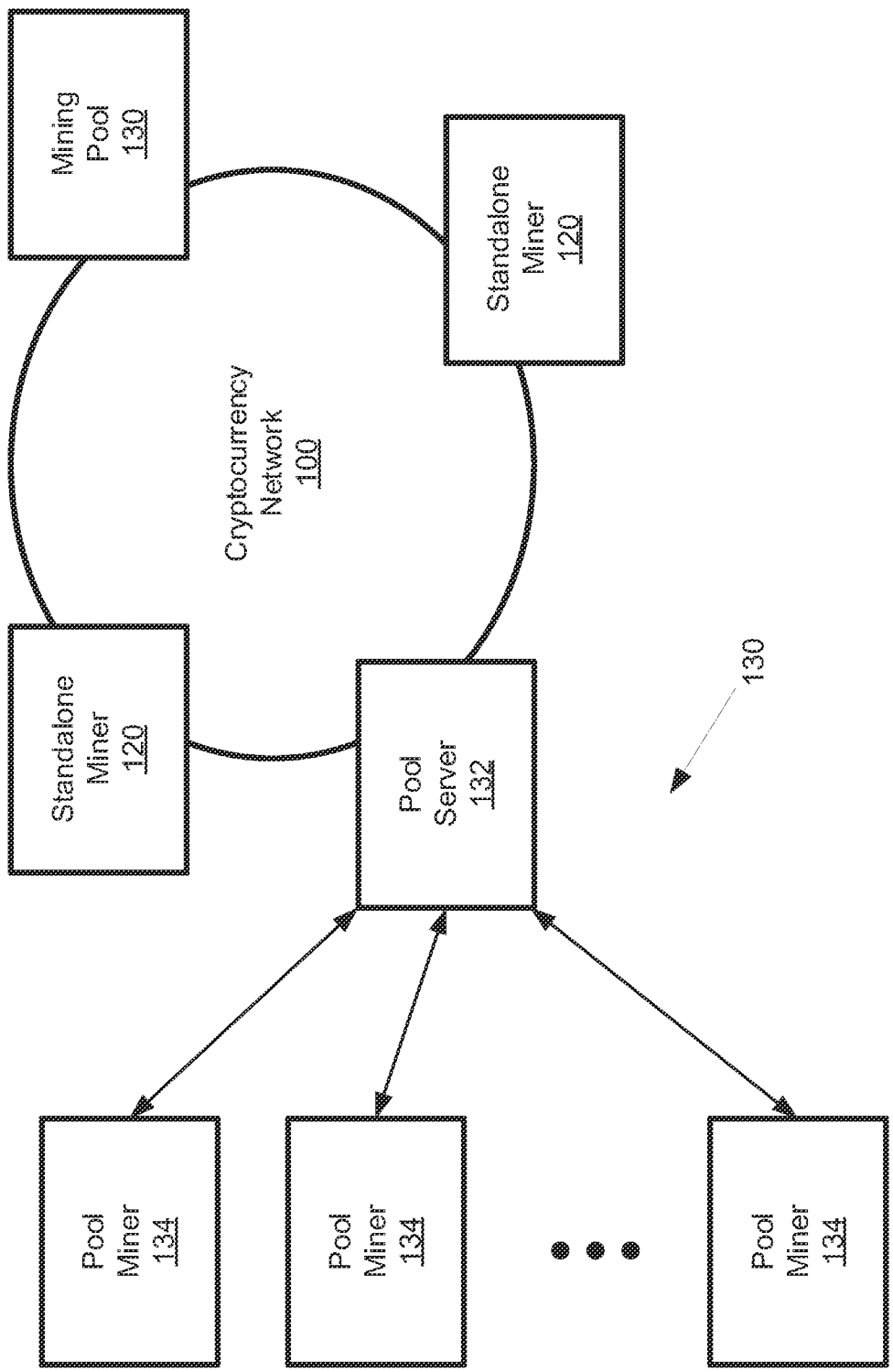
FIG. 1 shows a cryptocurrency network comprising miners in accordance with various aspects of the present disclosure.

Cryptocurrency miners and associated methods and apparatus are substantially shown in and/or described in connection with at least one of the figures, and are set forth more completely in the claims.

Advantages, aspects, and novel features of the present disclosure, as well as details of illustrated embodiments, will be more fully understood from the following description and drawings.

DETAILED DESCRIPTION OF VARIOUS ASPECTS OF THE DISCLOSURE

Various aspects of the present disclosure are presented by way of example. Such examples are non-limiting, and thus the scope of various aspects of the present disclosure should not necessarily be limited by any particular characteristics of the provided examples. In the following, the phrases "for example," "e.g.," and "exemplary" are non-limiting and are generally synonymous with "by way of example and not limitation," "for example and not limitation," and the like.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z."

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a component may be turned sideways so that its "top" surface is facing horizontally and its "side" surface is facing vertically, without departing from the teachings of the present disclosure.

In the drawings, various dimensions (e.g., thicknesses, widths, lengths, etc.) may be exaggerated for illustrative clarity. Additionally, like reference numbers are utilized to refer to like elements through the discussions of various examples.

The discussion will now refer to various example illustrations provided to enhance the understanding of the various aspects of the present disclosure. It should be understood that the scope of this disclosure is not limited by the specific characteristics of the examples provided and discussed herein.

Referring now to FIG. 1, an embodiment of a cryptocurrency network 100 is shown. In particular, the cryptocurrency network 100 may be implemented as a Bitcoin network. The present disclosure focuses primarily upon Bitcoin and the Bitcoin network. However, aspects of the present disclosure are also applicable to other cryptocurrencies, also referred to as Altcoin, such as, for example, Litecoin, Dogecoin, Ethereum, etc. and their respective networks. Similarly, the present disclosure focuses primarily on aspects of mining pool miners that are members of a Bitcoin mining pool. However, aspects of the present disclosure are also applicable to standalone miners and/or mining pool miners of Bitcoin and/or Altcoin networks.

As shown, the cryptocurrency network 100 includes multiple standalone miners 120 and multiple mining pools 130, which are operably coupled to one another via various networks such as LANs, WANs, cellular, satellite, and/or the Internet networks. The standalone miners 120 and mining pools 130 of the cryptocurrency network compete with each other in a decentralized manner to create a new block of processed Bitcoin transactions (e.g., transfers of Bitcoin between parties), and add the newly created block to the blockchain for the cryptocurrency network 100.

The blockchain is essentially a growing list or ledger of cryptographically linked records of transactions called blocks. Each block contains a cryptographic hash of the previous block, a timestamp, and transaction data. The blocks form a chain, with each additional block reinforcing the ones before it. As such, blockchains are resistant to modification because any given block cannot be altered retroactively without altering all subsequent blocks.

The creation of a new block is designed to be computationally intensive so as to require the cryptocurrency network 100 to spend a specified amount of time on average to create a new block. For example, the Bitcoin network is designed to create and add a new block to the blockchain every 10 minutes on average. The cryptocurrency network 100 periodically adjusts the computational difficulty of creating a new block to maintain the 10 minute target. In this manner, the cryptocurrency network 100 may create new blocks in a relatively steady manner despite ever changing computational capacity. For example, adding new standalone miners 120, mining pool miners 134, and/or mining pools 130 to the cryptocurrency network 100 increases the overall computational capacity of the cryptocurrency network 100. Such increased computational capacity reduces the time required to create and add a new block to blockchain. However, the cryptocurrency network 100 periodically adjusts the computational difficulty of creating a new block to maintain the 10 minute target. As a result, the cryptocurrency network 100 eventually detects that blocks are being created at a rate faster than the 10 minute target and appropriately increases the difficulty of creating a new block so as to counteract the increased computational capacity and maintain the roughly 10 minutes per block average.

To incentivize parties to undertake the computationally difficult task of generating a new block, the cryptocurrency network 100 compensates the standalone miners 120 and mining pools 130 for their efforts. In particular, each new block generates a quantity of new currency (e.g., 6.25 Bitcoins) as well as service fees from all transactions in the block. These new coins and service fees are awarded to the first entity (e.g., standalone miner 120 or mining pool 130) that solves the Proof-of-Work algorithm for the next block to be added to the blockchain. The Proof-of-Work algorithm is essentially a computationally intensive process that creates a new block that satisfies a cryptographic hash target. Thus, the standalone miners 120 and mining pools 130 are in competition with one another since only the first entity to solve the Proof-of-Work algorithm receives the associated block award.

Given the all or nothing nature of the block awards, mining pools 130 have formed. In general, a mining pool 130 includes a pool server 132 and several mining pool miners or members 134. The pool server 132 divides the Proof-of-Work into substantially smaller jobs and distributes such smaller jobs to the mining pool miners 134 in the mining pool 130. By completing smaller jobs, mining pool miners 134 obtain shares of a block award won by the mining pool 130. In this manner, each of the mining pool miners 134 may earn a smaller award (e.g., a share of a block award proportional to their contribution to completing the Proof-of-Work) on a more frequent basis than if each of the mining pool miners 134 were operating as a standalone miner 120.

Figure 2:
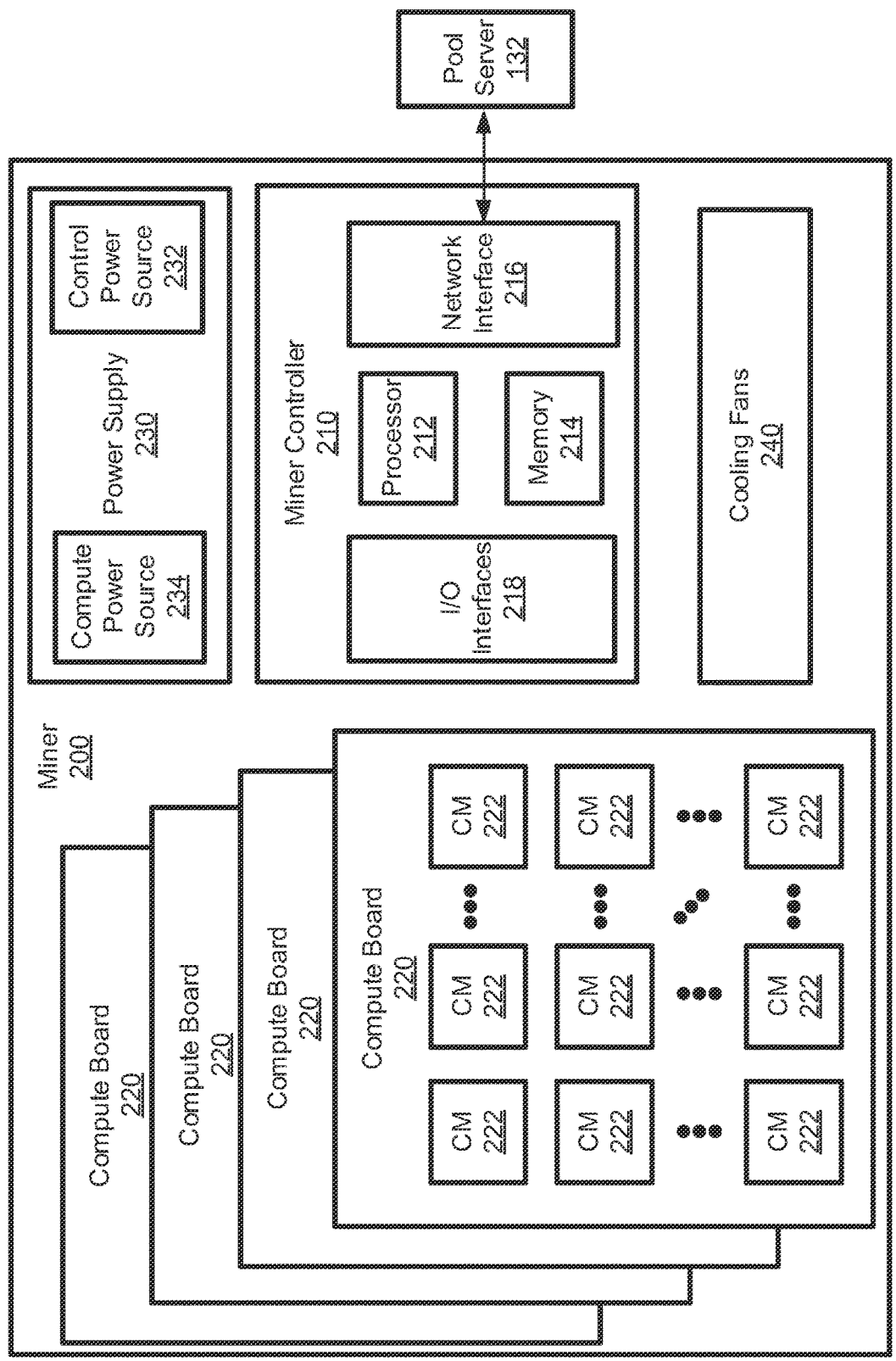
FIG. 2 shows a block diagram of a miner of FIG. 1.

A block diagram of a miner 200 is shown in FIG. 2, which is suitable for implementing one of the mining pool miners 134 of the mining pool 130. As shown, the miner 200 includes a miner controller 210, compute boards 220, a power supply 230, and cooling fans 240.

The miner controller 210 generally manages the components of the miner 200. In particular, the miner controller 210 interacts with pool server 132 on the behalf of the compute boards 220. To this end, the miner controller 210 obtains jobs from the pool server 132, distributes the jobs to the compute boards 220, and submits Proof-of-Work to the pool server 132 for the jobs completed by the compute boards 220.

As shown, the miner controller 210 may include a processor 212, memory 214, a network interface 216, and various input/output (I/O) interfaces 218. The processor 212 may be configured to execute instructions, manipulate data, and generally control operation of the other components of the miner 200 as a result of its execution. To this end, the processor 212 may include a general-purpose processor such as an x86 processor or an ARM processor, which are available from various vendors. However, the processor 212 may also be implemented using an application-specific processor, an application-specific integrated circuit (ASIC), programmable gate arrays, and/or other logic circuitry.

The memory 214 may store instructions and/or data to be executed and/or otherwise accessed by the processor 212. In some embodiments, the memory 214 may be completely and/or partially integrated with the processor 212. The memory 214 may store software and/or firmware instructions which may be executed by processor 212. The memory 214 may further store various types of data which the processor 212 may access, modify, and/or otherwise manipulate in response to executing instructions from memory 214. To this end, the memory 214 may comprise volatile and/or non-volatile storage devices such as random-access memory (RAM) devices, read only memory (ROM) devices, flash memory devices, solid state device (SSD) drives, etc.

The network interface 216 may enable the miner 200 to communicate with other computing devices such as the pool server 132. In particular, the network interface 216 may permit the processor 212 to obtain jobs from the pool server 132 and submit completed jobs to the pool server 132. To this end, the networking interface 216 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, 5G, etc.), and/or some other type of networking interface capable of providing a communications link between the miner 200 and other devices such as the pool server 132.

Finally, the I/O interfaces 218 may generally provide communications and control paths between the processor 212 and the other components of the miner 200 such as the compute boards 220, power supply 230, and cooling fans 240. Via such interfaces, the processor 212 may control the operation of such components. For example, the processor 212 may use such I/O interfaces 218 to initialize the compute boards 220, distribute jobs to the compute boards 220, receive completed jobs from the compute boards 220, selectively enable/disable the power supply 230, and selectively turn on/off cooling fans 240, among other things.

In one embodiment, the one or more I/O interfaces 218 include a Serial Peripheral Interface (SPI) interface via which the processor 212 may communicate with the compute boards 220. In particular, each compute board 220 may include a SPI interface. A four-wire serial interface bus may connect the compute modules 222 of the compute boards 220 in series to the miner controller 210 via their respective SPI interfaces. In such an embodiment, the miner controller 210 and computer modules 222 may operate in a master-slave arrangement, wherein the miner controller 210 acts as the single master of the SPI four-wire bus and each of the computer modules 222 operate as slaves on the SPI four-wire bus. While the miner controller 210, in one embodiment, utilizes an SPI interface and associated bus to communicate with the computer modules 222, other interconnect technologies may be used in other embodiments.

Each compute board 220 may include several compute modules 222. Each compute module 222, likewise, may include several compute engines that perform computational aspects of completing a job. In one embodiment, each compute module 222 is implemented via an application specific integrated circuit (ASIC). However, the compute modules 222 and their respective compute engines may be provided by other forms of circuitry.

In one embodiment, a miner 200 includes 4 compute boards, each compute board 220 includes 28 compute modules 222, and each compute module 222 includes 12 compute engines. Such a miner 200 thus provides 1,344 (4×28× 8) compute engines. The above quantities of compute boards 220, compute modules 222, and compute engines were provided merely for context. Other embodiments of the miner 200 may include different quantities of such components.

Per the Bitcoin standard, a candidate block header must have a message digest or hash value that satisfies a current target value in order to be deemed a valid block header suitable for adding to the blockchain. Such a message digest is computed per a double SHA-256 hash of the block header. Specifically, a compute engine generates a double SHA-256 hash of a candidate block header by computing a first message digest or hash value of the candidate block header per the SHA-256 algorithm specified by Federal Information Processing Standards Publication 180-4 (FIPS Pub. 180-4). The compute engine then computes a second message digest or final hash value of the candidate block header by performing a SHA-256 hash of the first message digest. Thus, the compute engine performs a double hash of the candidate block header to determine whether its double hash value satisfies a target value and is therefore a valid block header. Thus, for Bitcoin and various Altcoin embodiments of the miner 200, the compute boards 220 may also be referred to as hashing boards 220 since the compute engines perform various hashing functions and/or various cryptographic algorithms addressing a similar goal as such hashing functions.

While Bitcoin and some other cryptocurrencies utilize the SHA-256 hashing algorithm as part of their Proof-of-Work algorithms, other cryptocurrencies may use other cryptographic and/or hashing algorithms as part of their Proof-of-Work algorithm. For example, Litecoin and Dogecoin use the scrypt key-derivation function and Ethereum uses the Ethash algorithm. Thus, for embodiments of the miner 200 designed to mine such Altcoins, the compute boards 220 may include compute modules 222 designed to compute these other cryptographic algorithms.

The power supply 230 generally converts alternating current (AC) voltage to a direct current (DC) voltage suitable for the compute boards 220 and other components of the miner 200. In one embodiment, the power supply 230 receives 220V AC voltage from, for example, a wall mains outlet and efficiently converts the received power to one or more DC voltages distributed to various components of the miner 200. As shown, the power supply 230 may provide a control power supply 232, a compute power supply 234, as well as other power supplies. The control power supply 232 may supply one or more DC voltages used to power a control power domain of the compute boards 220. The compute power supply 234 may supply control power (e.g., via one or more supplied DC voltages) used to power a compute power domain of the compute boards 220.

In one embodiment, the control power supply 232 and compute power supply 234 are selectively enabled via one or more signals of the miner controller 210. As such, the miner controller 210 may selectively enable/disable the power supplies 232, 234 so as to selectively power-up/power-down the respective power domains of the compute boards 220. For example, the miner controller 210 may power-up the control power domain of the compute boards 220 in order to configure and confirm operation of the compute boards 220 before powering-up the compute domain, which in certain embodiments consumes substantially more power than the control power domain.

The cooling fans 240 generally comprise active thermal components that aid in maintaining the other components of the miner 200, especially the compute boards 220 within a thermal envelope associated with high operating efficiency. Beyond the active thermal components of the cooling fans 240, the miner 200 may include other passive thermal components such as heat sinks, heat pipes, thermal paste, etc. that further aid in maintaining the components of the miner 200 within the desired thermal envelope.

Figure 3:
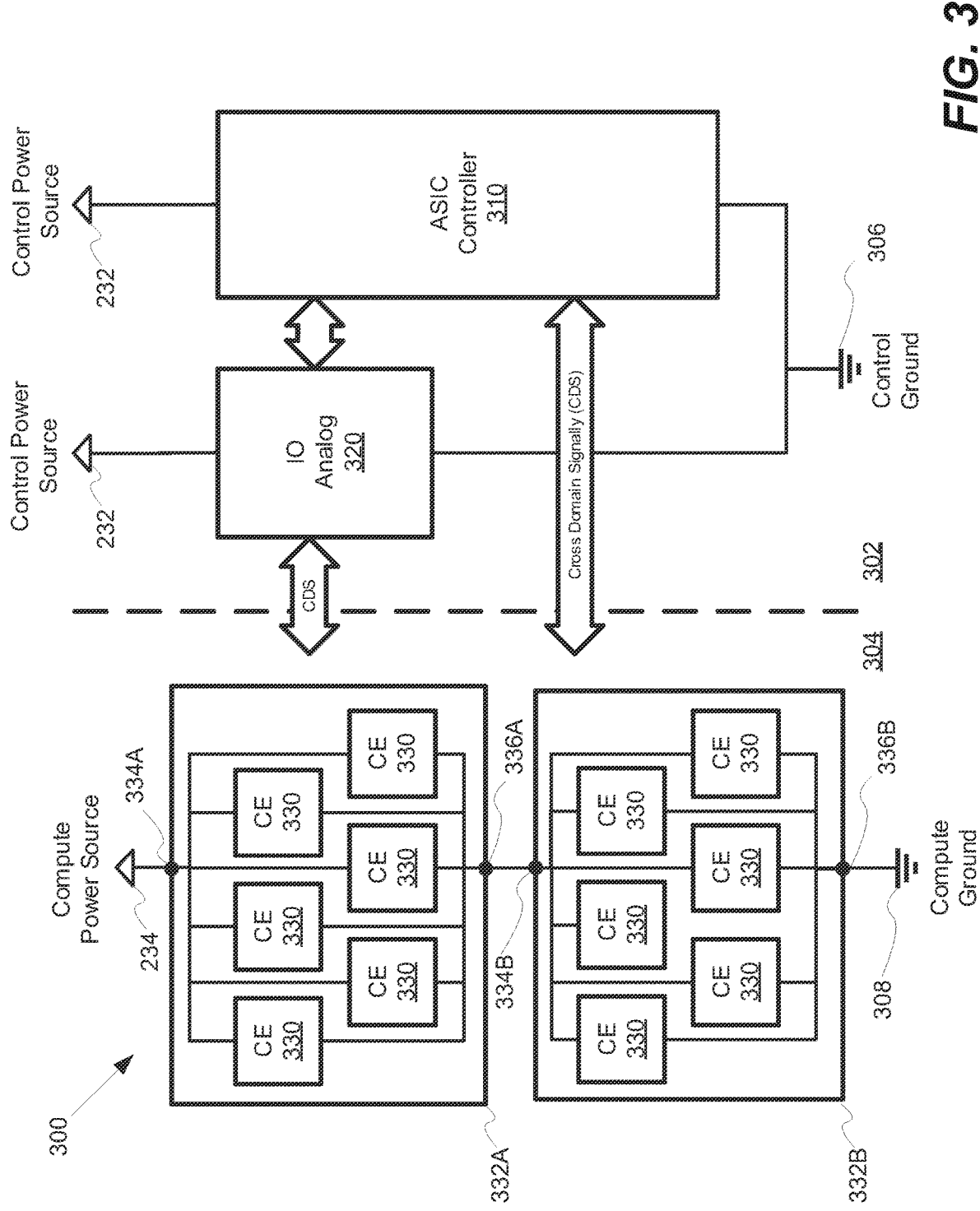
FIG. 3 shows a block diagram of a compute module of FIG. 2.

Referring now to FIG. 3, a block diagram depicts various aspects of an ASIC 300 that implements a compute module 222 of the compute board 220. As shown, the ASIC 300 comprises a control power domain (first power domain) 302 and a compute power domain (a second power domain) 304. Control circuitry, such as a compute module controller or ASIC controller 310, resides in the control power domain 302. Support circuitry, such as Input/Output (I/O)-analog circuitry 320, also resides in the control power domain 302. Several compute engines 330 reside in the compute power domain 304.

In general, the ASIC controller 310 configures and controls the components of the ASIC 300. The ASIC controller 310 further provides an interface between the miner controller 210 and the compute engines 330. To this end, the ASIC controller 310, among other things, receives jobs from the miner controller 210, distributes the jobs to the compute engines 330, and returns results of the completed jobs to the miner controller 210.

The I/O-analog circuitry 320 may include various I/O circuits that provide internal I/O interfaces between components of the ASIC 300 and various I/O circuits that provide external I/O interfaces between ASIC 300 and external components such as the miner controller 210. The I/O-analog circuitry 320 may further include various analog circuits that support and drive the compute engines 330. For example, the I/O-analog circuitry 320 may include voltage-controlled oscillators (VCOs) that provide clock signals that drive the computations of the compute engines 330. The I/O-analog circuitry 320 may further include analog to digital converters (ADC), which may be used to measure various temperatures and internal voltages of the compute engines 330 and/or other components of the ASIC 300.

In some embodiments, the ASIC controller 310 may include various components such as capacitors, logic gates, optical transceivers, etc. that permit cross domain signaling between components of the control power domain 302 and components of the computer power domain 304 while maintaining DC separation of such power domains 302, 304. For example, in some embodiments, the ASIC controller 310 communicates with the compute engines 330 via capacitors and associated logic circuitry that provide AC signaling across domains and DC restoration of such AC signaling. Such circuitry may further aid in maintaining separation of and reducing leakage current between power domains 302, 304.

Each compute engine 330 may perform computational aspects of creating a valid block header and/or aspects of a Proof-of-Work algorithm. In particular, each compute engine 330 may generate a double SHA-256 hash of a candidate block header as explained above. As such, the compute engine 330 in certain embodiments may be referred to as SHA engines or hashing engines. While Bitcoin and some other cryptocurrencies utilizes the SHA-256 hashing algorithm as part of their Proof-of-Work algorithms, other cryptocurrencies may use other cryptographic and/or hashing algorithms as part of their Proof-of-Work algorithm. For example, Litecoin and Dogecoin use the scrypt key-derivation function and Ethereum uses the Ethash algorithm. Thus, for embodiments of the miner 200 designed to mine such Altcoins, the compute engines 330 may compute these other cryptographic algorithms.

As shown, the ASIC controller 310 and analog circuitry 320 are coupled to the control power supply 232 of the power supply 230 and to a control ground 306 of the control power domain 302. Similarly, the compute engines 330 are coupled to the compute power supply 234 of the power supply 230 and to a compute ground 308 of the compute power domain 304. Thus, the ASIC controller 310 provides two separate power domains, which may be selectively powered-up per signals of the miner controller 210. For example, the controller power domain 302 and its components therein (e.g., the ASIC controller 310 and analog circuitry 320) may be powered up while the compute power domain 304 and its components (e.g., compute engines 330) remain in a powered-down state.

As shown in FIG. 3, the compute engines 330 may be arranged in one or more stories or groups 332A, 332B. Two stories 332A, 332B are shown, but other embodiments may have a greater quantity of stories (e.g., 3, 4, etc.). In each story 332A, 332B, the compute engines 330 are arranged in parallel between a respective voltage input node 334A, 334B and a respective voltage output node 336A, 336B of the story 332A, 332B. Moreover, the stories 332A, 332B are coupled in series between the compute power supply 234 and the compute ground 308. In particular, the voltage input node 334A of the top story 332A is coupled to the computer power supply 234, the voltage input node 334B of the bottom story 332B is coupled to the voltage output node 336A of the top story 332A, and the voltage output node 336B is coupled to the compute ground 308.

Furthermore, each story 332A, 332B is shown in FIG. 3 with six compute engines 330. In other embodiments, each story 332A, 332B may include a different quantity (e.g., 2, 3, 4, 5, 7, 8, etc.) of compute engines 330. Moreover, in some embodiments, each story 332A, 332B includes the same quantity (e.g., 6 as shown) of compute engines 330.

In certain embodiments, the computing engines 330 are the most power consuming components of the compute module 300. Furthermore, many computing engines 330 are required to achieve a competitive compute rate. If all computing engines 330 were powered in parallel, the compute voltage supply 234 would be required to supply a high current. Moreover, the compute engines 330 and other components would need to be able to operate efficiently when driven with high current.

Such a high current passing through compute module or ASIC 300 has various disadvantages. For example, the high current may produce a large IR drop that negatively affects the performance and functionality of the compute engines 330. The high current may further cause the compute module 300 to experience electromigration, which may decrease the reliability of compute modules 300 and its compute engines 330. In particular, electromigration may cause the eventual loss of connections between components and/or failure of the circuits implementing the compute engines 330.

By grouping the compute engines 330 in serially connected stories 332A, 332B, compute module 300 reduces the magnitude of the current supplied by the compute power supply 234. Furthermore, if each compute engine story 332A, 332B is implemented in generally the same manner with a same quantity of roughly identical compute engines 330, the current delivered to each compute engine story has nominally a same magnitude or similar magnitude within a certain variation. Thus, given the same power envelop at the compute module 300 level, a two-story arrangement as shown in FIG. 3 roughly reduces the magnitude of the current to a half of the current required by a single story in which all compute engines 330 are coupled in parallel between the compute power supply 234 and the compute ground 308. Similarly, a three-story arrangement roughly reduces the magnitude of the current to a third of the current required by a single-story implementation, and a four story arrangement roughly reduces the magnitude of the current to a fourth the current required by a single-story implementation.

Figure 4:
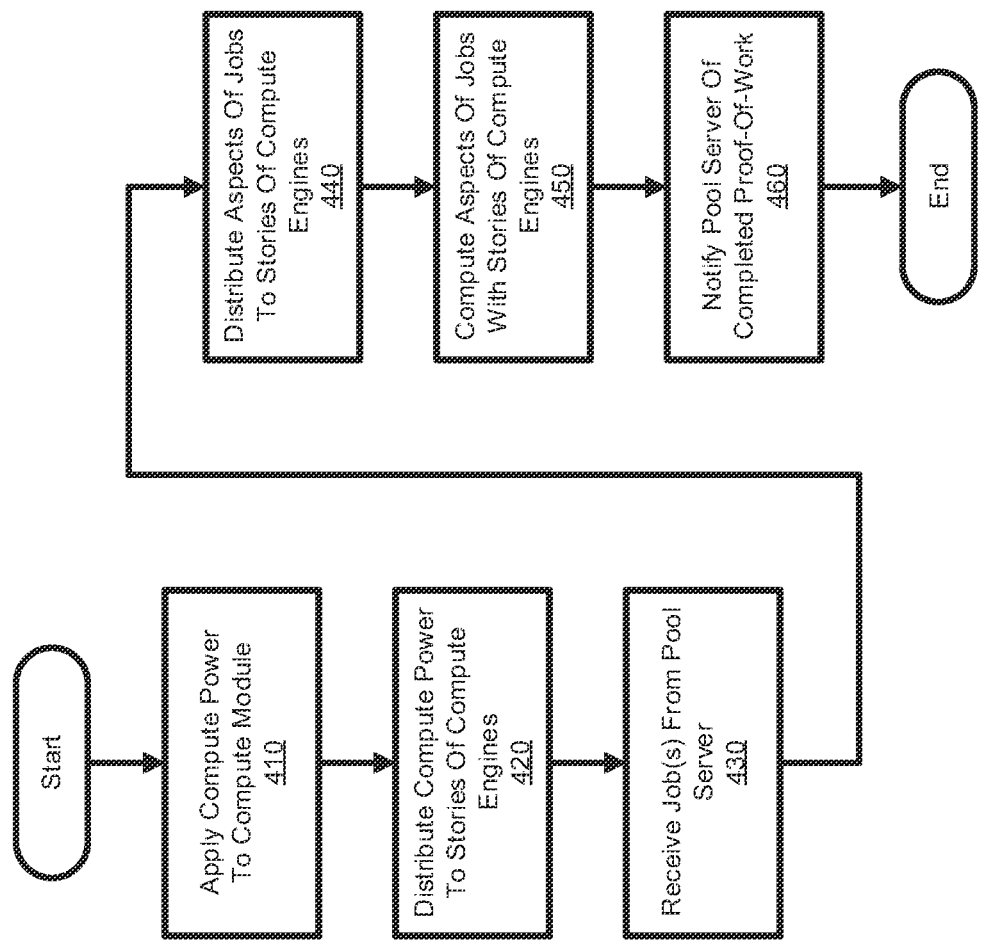
FIG. 4 shows a flowchart for an operating method implemented by the miner of FIG. 2.

Referring now to FIG. 4, a flowchart of an operating method 400 implemented by the miner 200 is shown. At 410, the compute power supply 234 applies power to the compute modules 300. The compute module 300 at 420 distributes the power to a plurality of compute engine stories 332A, 332B, which are powered in series. The miner controller 210 at 430 receives one or more jobs from a pool server 132 of a mining pool 130. At 440, the miner controller 210 distributes aspects of the one or more jobs to the plurality of compute engine stories 332A, 332B. The compute engines 330 of the stories 332A, 332B process at 450 aspects of the one or more jobs received from the miner controller 210 and provide their respective results to the miner controller 210. For example, each of the compute engines 330 may perform a double SHA-256 hash of a different candidate block header. At 460, the miner controller 210 may notify the pool server 132 of completed Proof-of-Work if one of the double SHA-256 hash values produced by the compute engines 330 satisfies a target value for a respective job of the one or more jobs obtained from the pool server 132.

While the foregoing has been described with reference to certain aspects and examples, those skilled in the art understand that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular examples disclosed, but that the disclosure includes all examples falling within the scope of the appended claims.

What is claimed is:

1. An integrated circuit chip for a cryptocurrency miner, the integrated circuit chip comprising:
   a power terminal;
   a ground terminal;
   a first compute engine story comprising a first voltage input, a first voltage output, and a first plurality of compute engine circuits coupled in parallel between the first voltage input and the first voltage output of the first compute engine story;
   a second compute engine story comprising a second voltage input, a second voltage output, and a second plurality of compute engine circuits coupled in parallel between the second voltage input and the second voltage output of the second compute engine story;
   input/output interface circuitry configured to receive a job and provide results of processing the job; and
   a controller configured to distribute aspects of the job to the first plurality of compute engine circuits and the second plurality of compute engine circuits; and
   wherein the first compute engine story and the second compute engine story are coupled in electrical series between the power terminal and the ground terminal with the first voltage input coupled to the power terminal, the second voltage input coupled to the first voltage output, and the ground terminal coupled to the second voltage output.

2. The integrated circuit chip of claim 1, wherein-the integrated circuit chip is implemented with an application specific integrated circuit (ASIC) chip.

3. The integrated circuit chip of claim 1, wherein the first compute engine story and the second compute engine story each comprises a same quantity of compute engine circuits.

4. The integrated circuit chip of claim 1, wherein each compute engine circuit comprises a hashing engine circuit.

5. The integrated circuit chip of claim 1, wherein each compute engine circuit comprises a SHA-256 hashing engine circuit.

6. The integrated circuit chip of claim 1, wherein each compute engine circuit computes a value per an scrypt algorithm.

7. The integrated circuit chip of claim 1, wherein each compute engine circuit of the first plurality of compute engine circuits comprises:
   an electrical input node coupled to the first voltage input of the first compute engine story; and
   an electrical output output node coupled the first voltage output of the first compute engine story.

8. A cryptocurrency miner, comprising:
   a compute power supply;
   a compute ground;
   a plurality of compute circuit boards, wherein each compute circuit board comprises a plurality of compute integrated circuit chips, and wherein each compute integrated circuit chip comprises a first compute engine story, a second compute engine story, and an integrated circuit controller; and
   a miner controller configured to receive one or more jobs from a pool server of a mining pool and distribute the one or more jobs among the plurality of compute circuit boards;
   wherein the first compute engine story of each compute integrated circuit chip comprises a first voltage input coupled to the compute power supply, a first voltage output, a first plurality of compute engine circuits coupled in parallel between the first voltage input and the first voltage output of the respective first compute engine story;
   wherein the second compute engine story of each compute integrated circuit chip comprises a second voltage input coupled to the first voltage output of a respective first computed engine, a second voltage output coupled to the compute ground, and a second plurality of compute engine circuits coupled in parallel between the second voltage input and the second voltage output of the respective second compute engine story; and
   wherein the integrated circuit controller of each compute integrated circuit chip interfaces its respective compute engine circuits with the miner controller.

9. The cryptocurrency miner of claim 8, wherein each compute engine of the plurality of compute circuit boards comprises a hashing engine.

10. The cryptocurrency miner of claim 8, wherein each compute engine of the plurality of compute circuit boards computes a double SHA-256 hash.

11. The cryptocurrency miner of claim 8, wherein the first compute engine story and the second compute engine story of a first compute integrated circuit chip of the plurality of compute integrated circuit chips each includes a same quantity of compute engine circuits.

12. The cryptocurrency miner of claim 8, wherein the plurality of compute integrated circuit chips are coupled in series to the miner controller via a serial bus.

13. The cryptocurrency miner of claim 12, wherein each compute integrated circuit chip of the plurality of compute integrated circuit chips is implemented with an application specific integrated circuit (ASIC) chip.

14. The cryptocurrency miner of claim 8, wherein each compute engine circuit of each first compute engine story comprises:
   an electrical input node coupled to the first voltage input of the respective first compute engine story; and
   an electrical output output node coupled the first voltage output of the respective first compute engine story.

15. A method of a cryptocurrency miner, comprising:
   applying power to a plurality of application specific integrate circuits (ASICs) that are coupled in series to a miner controller via a serial bus;
   distributing current through a first compute engine story and a second compute engine story of each ASIC, wherein the first compute engine story and the second compute engine story of each ASIC are coupled in electrical series between a compute power supply and a compute ground of the cryptocurrency miner, wherein compute engine circuits of the first compute engine story are coupled in electrical parallel between a first voltage input and a first voltage output of the first compute engine story, and wherein compute engine circuits of the second compute engine story are coupled in electrical parallel between a second voltage input and a second voltage output of the second compute engine story; and
   computing values with the compute engine circuits of the first and second compute engine stories of each ASIC, wherein the compute engine circuits are powered based on the current distributed to the first compute engine story and the second compute engine story.

16. The method of claim 15, comprising delivering nominally a same current through the first compute engine story and the second compute engine story of a first ASIC of the plurality of ASICs.

17. The method of claim 15, wherein computing values comprises computing the values per a scrypt algorithm.

18. The method of claim 15, further comprising:
   receiving a job from a mining pool; and
   distributing the job to the compute engine circuits of the first compute engine story and the second compute engine story of each ASIC.

19. The method of claim 15, wherein the first compute engine story and the second compute engine story each include a same quantity of compute engine circuits.

20. The method of claim 15, wherein the plurality of ASICs are distributed across a plurality of compute circuit boards.

* * * * *